Patented Jan. 26, 1943

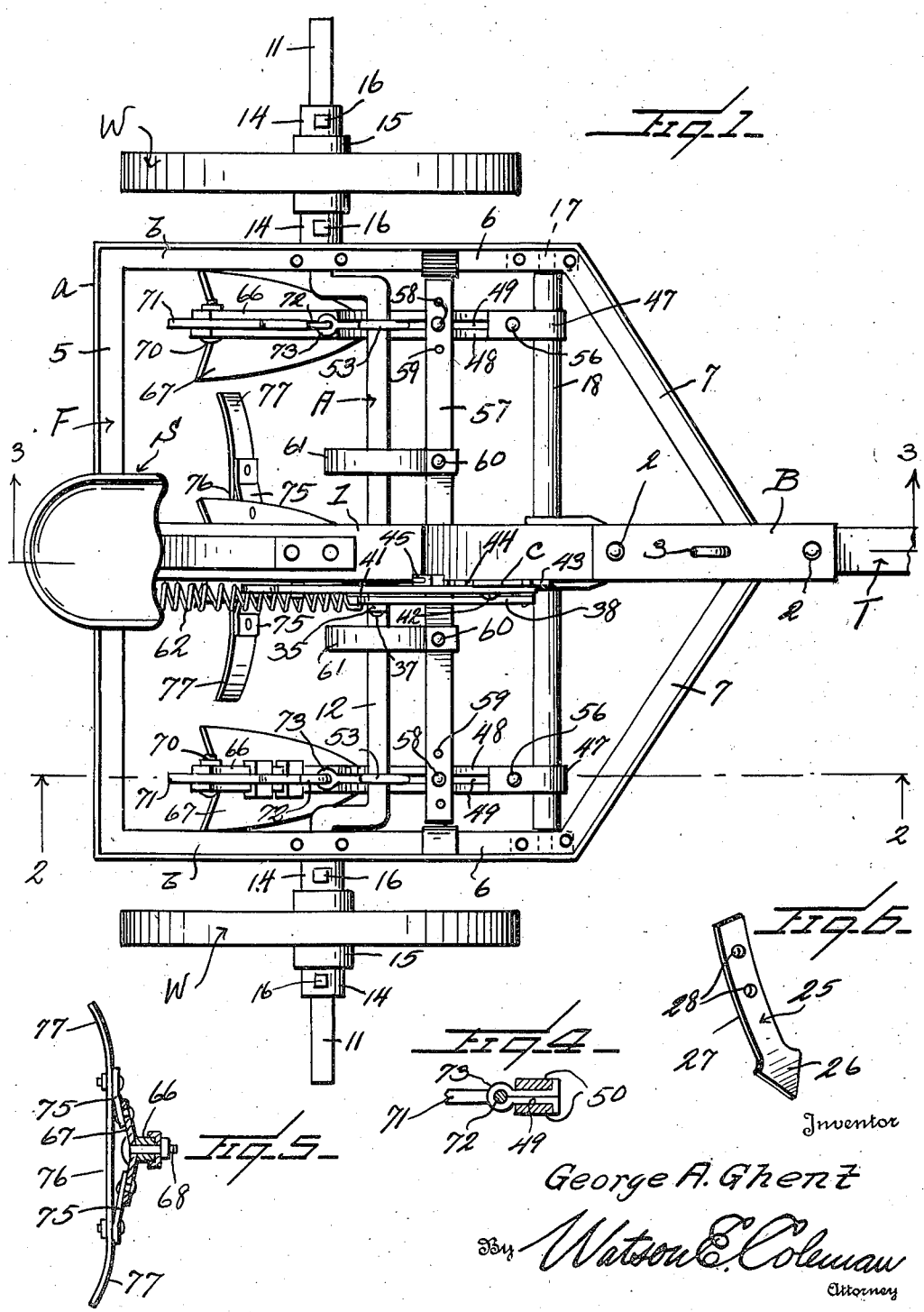

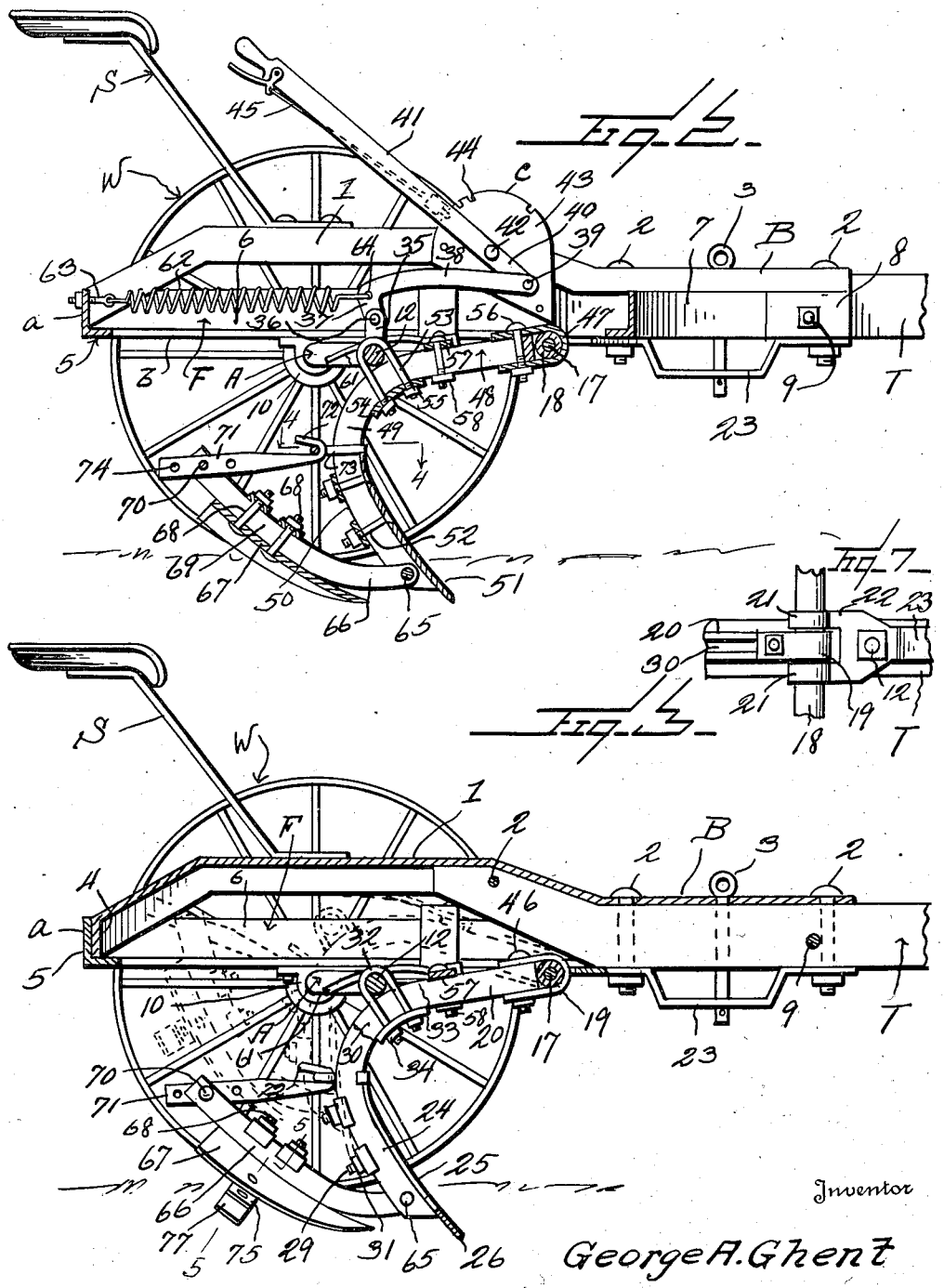

2,309,387

UNITED STATES PATENT OFFICE 2,309,387

CORRUGATOR

George A. Ghent, Buhl, Idaho

Application October 24, 1941, Serial No. 416,409

4 Claims. (Cl. 97—55)

This invention relates to a corrugator, and it is an object of the invention to provide an implement of this kind which can be easily converted from a three-row to a two-row, or vice versa.

It is also an object of the invention to provide an implement of this kind including a plurality of beams, each hung on center, and wherein it is possible for the shovels to be lined up directly with the wheels, thus providing a corrugator that will not clog in trash or even in corn stalks, as such surface obstructions will be held by the wheels without hampering the functioning of the shovels.

An additional object of the invention is to provide an implement of this kind so constructed and assembled to permit the same to be moved over culverts or ditches without the shovels becoming hooked into the same, and wherein the shovels are normally maintained lifted.

The invention also has for an object to provide an implement of this kind which is of light draft and which, on account of its balanced design, substantially eliminates neck weight on the draft animals, and whereby the plows work through the dirt for making corrugations with a minimum of frictional resistance.

A still further object of the invention is to provide an implement of this kind including corrugating plows which are normally raised, together with pedal means for forcing the shovels into the soil as desired, and wherein means are provided to level clods that might otherwise roll back into the corrugations as formed or dull sickles on mowing machines.

The invention consists in the details of construction and in the combination and arrangement of the several parts of my improved corrugator whereby certain important advantages are attained, as will be hereinafter more fully set forth.

In order that my invention may be the better understood, I will now proceed to describe the same with reference to the accompanying drawings, wherein—

Figure 1 is a view in top plan of a corrugator constructed in accordance with an embodiment of my invention, the draft tongue being shown in fragment;

Figure 2 is a vertical sectional view taken substantially on the line 2—2 of Figure 1, with parts in elevation;

Figure 3 is a vertical sectional view taken substantially on the line 3—3 of Figure 1, with parts in elevation;

Figure 4 is a fragmentary detailed sectional view taken substantially on the line 4—4 of Figure 2;

Figure 5 is an enlarged detailed sectional view taken substantially on the line 5—5 of Figure 3;

Figure 6 is a view in perspective of one of the front shovels or bull tongues unapplied; and Figure 7 is a fragmentary view in bottom plan illustrating the central supporting means for the front hanger bar.

As disclosed in the accompanying drawings, B denotes the central beam of the implement which is of channel formation and with its open face downwardly disposed. The rear portion 1 of the beam B, for a considerable distance, is upwardly offset or arched, as illustrated in Figures 2 and 3 of the drawings. Snugly fitted within the forward portion of the beam B and securely held thereto by the bolts 2, or otherwise as may be preferred, is the rear portion of a draft tongue or pole T. This rear portion of the draft tongue or pole T has associated therewith a conventional clevis bolt or pin 3 for proper attachment of the draft rigging. The rear end of the beam B is closed by a depending plate 4 welded or otherwise rigidly secured to the upstanding flange $a$ of the rear cross member 5 of a frame F. This frame F is of considerable width and has the forward extremities of its side members 6 continued by the inwardly and forwardly converging front members 7, the outer ends of which being provided with the forwardly directed plates 8 contacting with the opposite sides of the tongue or pole T below the beam B and bolted, as at 9, or otherwise securely attached thereto. The rear member 5, the side members 6 and the forwardly converging members 7 are herein disclosed as angle irons with the flanges $a$ upwardly disposed and the flanges $b$ thereof inwardly directed.

The side members 6, at substantially their longitudinal centers, have depending from the flanges $b$ thereof the bearings 10 for the trunnions 11 of the arched axle A. The arch 12 of the axle A is of a length to substantially bridge the space between the side members 6 of the frame F, yet is free to have swinging movement independently of the frame F. The trunnions 11 are of a length to extend a material distance beyond the sides of the frame F and freely mounted on these trunnions 11 are the ground engaging members or wheels W. Each of the wheels W is held in desired selected position on its trunnion 11 by the holding collars 14 positioned at opposite sides of the wheel for close contact with the ends of the hub 15 of the wheel.

The collars 14 are locked in their selected positions on the trunnion 11 by the set screws 16, or otherwise, as may be preferred. This mounting of the wheels W permit the same to be conveniently separated within a limited range as the requirements of practice may necessitate.

Interposed between and operatively supported by the bottom flanges b of the side members 6 of the frame F is the hanger bar 17. This bar 17, as illustrated in the accompanying drawings, is surrounded by a sleeve 18 substantially coextensive in length therewith. Freely engaged through the medium of a strap 19 is the forward end portion of a beam 20, such connection as afforded by the strap 19 permitting the bear 20 to have an up and down swinging movement. This beam 20 is maintained at substantially the transverse center of the frame F and below the upwardly offset portion 1 of the beam B by the collars 21 at opposite sides of the strap 19 and in contact therewith. These collars 21 are carried by the spaced arms 22 projecting rearwardly from the clevis loop 23 held to the under surface of the draft tongue or pole T by the bolts 2. The ear end portion of the beam 20 is downwardly and forwardly curved to provide a standard or sheth 24 to the forward edge face of which is secured a middle bull tongue or corrugating shovel 25. The shovel 25 is formed at its lower part to provide a ground working point 26 which impinges the soil to produce the desired corrugations, and the bull tongue or shovel 25 includes an elongated shank 27 provided with the longitudinally spaced openings 28. Holding bolts 29 are insertible from the front through these openings 28 and pass through a slot 30 provided in the beam 20. This slot extends from substantially one end of the beam 20 to the other. These bolts 29 have engaged therewith the usual holding nuts 31. By this mounting of the bull tongue or shovel 25 it is believed to be obvious that the extent of projection of the point 26 of the shovel or tongue may be readily adjusted with respect to the lower end of the standard or sheth 24, and in accordance with the desired depth of corrugation.

The beam 20 is of a length to underlie the arch 12 of the axle A, and which arch 12 is forwardly directed at all times with respect to the frame F. The central portion of the beam 20 is connected to the arch 12 by a U-bolt 32 which freely straddles the arch 12 and which also freely extends through the slot 30 of the beam 20. The legs of the U-bolt 32 are disposed through a plate 33 which has sliding contact with the under face of the beam 20 and held thereto by the conventional nuts 34. As the arch 12 is rocked, the beam 20 will be raised or lowered and the portion of the beam 20 with which the U-bolt 32 and its plate 33 coact is disposed on a curvature of such radius as to readily compensate for the relative movement of the arch 12 and the beam 20. The arch 12 to one side of but closely adjacent to the beam B is provided with a rock arm 35 rigid therewith and to which arm 35 is pivotally connected, as at 36, a depending lug 37 provided at the rear portion of an elongated and forwardly directed rigid link 38. The forward end portion of this link 38 is pivotally connected, as at 39, to a depending tail piece 40 carried by the lever 41 pivotally connected, as at 42, to the beam B at the forward part of the upwardly offset portion 1. The beam B, adjacent to the lever 41, carries an upstanding rack plate 43 having the suitably positioned holding notches 44 with which selectively engage a conventional latching mechanism 45 carried by the lever 41. It is to be noted that one of the notches 44 is so positioned as to lock the beam 20 against dropping movement when in its normal raised position while other of the notches 44 are so positioned to hold the beam 20 against upward swinging movement after the beam 20 has been swung downwardly as desired. The first-named notch and the last-named notches are separated by an arcuate portion c of such length to readily allow automatic lifting of the beam 20 from its selected lowered position to its raised position after, of course, the latch mechanism 45 has been released.

It is to be noted that the strap 19 is held to the forward or upper portion of the beam 20 by a conventional removable bolt 46 whereby it is possible to readily remove the beam 20 when it is desired, and with equal facility to return it to working position when needed.

Pivotally engaged with the bar 17, or more particularly the sleeve 18 thereon, at opposite sides of the beam B through the medium of the straps 47, are the side beams 48. These beams 48 are of duplicate construction and each of these beams is also constructed in the same manner as the beam 20. Each of the beams 48 is provided, substantially from one end to the other, with a slot 49 similar to the slot 30 of the beam 20, and each of these beams 48 is also provided with a downwardly and forwardly disposed standard or sheth 50. Held to the forward face of the standard or sheth 50 of each of the beams 48 is a bull tongue or corrugating shovel 51, it being the same as the tongue or shovel 25 hereinbefore referred to and held to the standard or sheth 50 by the holding bolts 52 as previously set forth with respect to the holding bolts 29 for the tongue or shovel 25. Also disposed through the slot 49 of each of the standards 48 is a U-bolt 53 freely straddling the arch 12 of the axle A and having its legs freely disposed through the slot 49 and held to a slide plate 54 by the nuts 55. This slide plate 54 coacts with the under arcuate edge of the beam 48 in the same manner and for the same purpose as herein set forth with respect to the U-bolt 32 and its coacting plate 33.

Each of the straps 47 is held to its beam 48 by a removable bolt 56 whereby the beam 48 can be removed or applied when desired. It is also to be noted that the mounting of each of the beams 48 is such as to allow the same to readily swing up and down as required and also to allow each of the beams 48 to be adjusted into desired selected positions lengthwise of the bar 17 or the sleeve 18, as may be desired, in order to have all of the bull tongues or corrugating plows in desired spaced relation.

It is important that all of the beams 20 and 48 be caused to raise and lower in unison, and in order to assure this unitary movement an elongated rigid member or bar 57 is disposed over the tops of the applied beams 20 and 48 and held thereto by the holding bolts 58 extending down through the bar 57 and through the slots 30 or 49 of the beams 20 or 48. The end portions of the bar 57 are provided with the longitudinally spaced openings 59 through which the end holding bolts 58 are to be selectively inserted, dependent upon the relative adjustment of the beams 48 one with respect to the other or with respect to the central beam 20. This bar 57 is secured to the beams 20 and 48 at a point forwardly of but in relatively close proximity to the arch 12 of the axle A. This bar 57, at opposite sides of the beam B, has secured thereto, as at 60, the rearwardly disposed elongated pedals 61. These pedals 61 are of a length to overlie the arch 12 of the axle A and provide means whereby the occupant of the seat structure S may readily force the bull tongues or corrugating shovels 25 and 51 into soil as desired by requisite pressure by the feet on the pedals 61. The seat structure S is of a conventional type and is mounted upon the rear part of the upwardly offset portion 1 of the beam B and, as illustrated in Figure 2, the lever 41 is of a length to terminate within easy reach of the occupant of the seat structure.

The beams 20 and 48 are constantly urged upwardly into their fully raised position through the medium of a retractile member 62 of requisite tension. This member 62 is herein disclosed as a coil spring having one end portion anchored, as at 63, to the upstanding flange a of the rear cross member 5 of the frame F, and its opposite end portion suitably anchored, as at 64, to the rear end portion of the rigid link 38.

Each of the beams 20 or 48, at the lower extremity of its standard or sheth 24 or 50, has pivotally connected thereto, as at 65, the forward end portion of an upwardly and rearwardly disposed elongated slotted arm 66. Held to the rear face of each of these arms 66 is a clean-out shovel 67 which rides in the corrugation formed by the bull tongue or corrugating shovel immediately in advance thereof. Each of these shovels 67 is held to its arm 66 by the holding bolts 68 extending through the shovel 67 and through the slot 69 extending lengthwise of the arm 66 from substantially one end thereof to the other. The upper portion of each of the arms 66 has pivotally connected thereto, by a pin 70, the rear portion of a rigid link 71. This link 71, at its opposite end, is provided with a hook 72 which engages with an I-member 73 carried by the beam 20 or 48 immediately above the bull tongue or corrugating shovel thereon. The link 71 extends through the slot 69 at the upper part of the arm 66 and the pin 70 selectively disposed through one of the longitudinally spaced openings 74 spaced lengthwise of the link 71. By this means the arm 66 is held at predetermined angular relation with respect to its associated beam 20 or 48 to provide for the desired positioning of the shovel 67 carried thereby. It is to be noted that the assembly of the parts is such that when the shovels 25 and 51 and 67 are in their lowered or working position they are substantially lined with the wheels W, or more particularly the portions of the wheels having rolling contact with the ground surface. This is of importance as it substantially eliminates the implement clogging in trash or even in corn stalks, since any surface obstructions such as these will be held by the wheels W as the shovels 25 and 67, and more particularly the shovels 25, continue to function.

It is also to be noted that the beams 20 and 48 are self-lifting under the action of the spring 62, thus making it much easier for the operator. It is to be further pointed out that by providing the spring 62 as a means for automatically raising the beams 20 and 48, the tongues or shovels 25, together with the shovels 67, can be moved over culverts or ditches without the shovels hooking in the same. In view of the center or line suspension of these shovels as hereinbefore pointed out, these shovels need be elevated no higher than the lowest rim of a wheel W. It is also to be stated that the wide adjustment permitted of the wheels W allow running down center of any width of corrugations, and it is to be further pointed out that the construction of the implement as herein embodied is of extremely light draft and the friction created in its use is no more than pulling garden hoes through the soil for making corrugations. It is also to be further pointed out that on account of the balanced design of the implement, there is no neck weight on the draft animals and that the structure is such that with only a pair of draft animals the implement can be operated as satisfactorily on either two or three rows as could be done with a tractor.

The shovel 67 operatively supported by the beam 20 has secured rearwardly thereof at its upper portion by the brackets 75 a transversely disposed bar 76 which extends a desired distance laterally beyond the opposite sides of the shovel 67 to provide leveling arms 77. These arms 77 are of material width and preferably flat in cross-section. These arms 77 provide effective means to level clods that might otherwise roll back into the corrugation as formed or dull sickles on mowing machines.

From the foregoing description it is thought to be obvious that a corrugator constructed in accordance with my invention is particularly well adapted for use by reason of the convenience and facility with which it may be assembled and operated.

I claim:

1. A corrugator or the like comprising a wheel supported crank axle, a frame structure mounted on the axle with the crank of the axle between the sides of the frame structure, a beam, means for pivotally connecting the forward portion of the beam with the frame to allow the beam to have up and down movement, ground working means carried by the beam, a lever pivotally engaged with the frame structure, a rigid link operatively connected to the lever and to the arch whereby the lever moves simultaneously with the swinging of the arch and beam, a retractile member operatively engaged with the frame structure and the link for automatically raising the arch of the axle and the beam, and means coacting with the lever for locking the arch of the axle and the beam when in its raised position or in a lowered position.

2. A corrugator or the like comprising a wheel supported crank axle, a frame structure mounted on the axle with the crank of the axle between the sides of the frame structure, a beam, means for pivotally connecting the forward portion of the beam with the frame to allow the beam to have up and down movement, ground working means carried by the beam, a lever pivotally engaged with the frame structure, a rigid link operatively connected to the lever and to the arch whereby the lever moves simultaneously with the swinging of the arch and beam, a retractile member operatively engaged with the frame structure and the link for automatically raising the arch of the axle and the beam, means coacting with the lever for locking the arch of the axle and the beam when in its raised position or in a lowered position, the ground working means including a corrugating shovel, and a clean-out shovel positioned rearwardly of the corrugating shovel.

3. A corrugator or the like comprising a wheel supported crank axle, a frame structure mounted on the axle with the crank of the axle between the sides of the frame structure, a beam, means for pivotally connecting the forward portion of the beam with the frame to allow the beam to have up and down movement, ground working means carried by the beam, a lever pivotally engaged with the frame structure, a rigid link operatively connected to the lever and to the arch whereby the lever moves simultaneously with the swinging of the arch and beam, a retractile member operatively engaged with the frame structure and the link for automatically raising the arch of the axle and the beam, means coacting with the lever for locking the arch of the axle and the beam when in its raised position or in a lowered position, the ground working means including a corrugating shovel, a clean-out shovel positioned rearwardly of the corrugating shovel, said clean-out shovel being pivotally supported by the lower portion of the beam, and means coacting with the upper portion of the clean-out shovel and the beam for holding the clean-out shovel in selected angular adjustment with respect to the corrugating shovel.

4. A corrugator or the like comprising a wheel supported crank axle, a frame structure mounted on the axle with the crank of the axle between the sides of the frame structure, a beam, means for pivotally connecting the forward portion of the beam with the frame to allow the beam to have up and down movement, ground working means carried by the beam, a lever pivotally engaged with the frame structure, a rigid link operatively connected to the lever and to the arch whereby the lever moves simultaneously with the swinging of the arch and beam, a retractile member operatively engaged with the frame structure and the link for automatically raising the arch of the axle and the beam, means coacting with the lever for locking the arch of the axle and the beam when in its raised position or in a lowered position, the ground working means including a corrugating shovel, and leveling arms extending laterally beyond opposite sides of the shovel.

GEORGE A. GHENT.